US012308009B2

(12) United States Patent
Lee et al.

(10) Patent No.: US 12,308,009 B2
(45) Date of Patent: May 20, 2025

(54) MAGNETIC COUPLING FOR SOUND TRANSMISSION

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 18/636,374

(22) Filed: Apr. 16, 2024

(65) Prior Publication Data

US 2024/0274109 A1 Aug. 15, 2024

Related U.S. Application Data

(62) Division of application No. 17/976,278, filed on Oct. 28, 2022, now Pat. No. 11,978,428, which is a division of application No. 16/862,754, filed on Apr. 30, 2020, now Pat. No. 11,527,229.

(51) Int. Cl.

*G10K 11/172* (2006.01)
*G10K 11/34* (2006.01)

(52) U.S. Cl.

CPC ............ *G10K 11/172* (2013.01); *G10K 11/34* (2013.01)

(58) Field of Classification Search

None

See application file for complete search history.

(56) References Cited

U.S. PATENT DOCUMENTS

2020/0100021 A1 * 3/2020 Pavlov ................ H04R 1/2842

* cited by examiner

*Primary Examiner* — Kenny H Truong

(74) *Attorney, Agent, or Firm* — Christopher G. Darrow; Darrow Mustafa PC

(57) ABSTRACT

Systems for magnetoacoustically transferring sound across an acoustic barrier include first and second acoustic resonators positioned on opposite sides of the barrier. Each of the first and second resonators includes an attached magnet. Via magnetic coupling between the magnets, an acoustic oscillation at the first resonator induces an oscillation of the same frequency at the second resonator. Thus sound waves absorbed at the first resonator are magnetically transferred across the barrier to the second resonator, from which they are emitted.

5 Claims, 7 Drawing Sheets

MAGNETIC COUPLING FOR SOUND TRANSMISSION

CROSS-REFERENCE TO RELATED APPLICATIONS

This application is a divisional of U.S. patent application Ser. No. 17/976,278, filed Oct. 28, 2022, now U.S. Pat. No. 11,978,428, which is a divisional of U.S. patent application Ser. No. 16/862,754, filed Apr. 30, 2020, now U.S. Pat. No. 11,527,229, both which are incorporated by reference in their entirety.

TECHNICAL FIELD

The present disclosure generally relates to sound transmission structures and, more particularly, to structures utilizing magnetic coupling for transfer of sound across an acoustic barrier.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Sound can propagate through compressible media such as air or water. If there is no medium (i.e., vacuum) or a medium is very rigid (negligible compressibility), sound propagation is prohibited. These sound barriers need to be overcome in some applications including communication, and wireless sound (or vibration) energy harvesting. Magnet coupling between magnets can exert a repulsive or attractive force depending on the polarity of the magnets. Such a non-contact force induced by magnetic coupling can be used to transport acoustic energy across sound barriers.

It would be desirable to provide a passive control system, requiring no input, and enabling a metamaterial composed of membrane resonators to specifically reflect high amplitude acoustic waves. It would additionally be desirable to provide a simple and highly effective mechanism for active control of such a metamaterial.

SUMMARY

This section provides a general summary of the disclosure, and is not a comprehensive disclosure of its full scope or all of its features.

In various aspects, the present teachings provide an acoustic coupling system. The system includes a first magnetoacoustic transceiver, having an acoustic resonance mode at a resonance frequency. The first magnetoacoustic transceiver has a first acoustic resonator, and a first magnet attached to the first acoustic resonator. The system further includes a second magnetoacoustic transceiver spaced apart from the first magnetoacoustic transceiver, and having an acoustic resonance mode at the resonance frequency. The second magnetoacoustic transceiver includes a second acoustic resonator and a second magnet attached to the second acoustic resonator. The system further includes an acoustic barrier disposed between the first and second magnetoacoustic transceivers. Acoustic oscillation at the first acoustic resonator induces an oscillation in the second acoustic resonator at the same frequency, via magnetic coupling of the first and second magnets.

In other aspects, the present teachings provide a broadband, magnetoacoustic coupling system. The system includes a first magnetoacoustic transceiver pair, each magnetoacoustic transceiver of the first pair having a first resonance frequency and comprising an elastic membrane and a magnet attached to the membrane. The magnetoacoustic transceivers of the first pair separated by a separation space. The system also includes a second magnetoacoustic transceiver pair, each magnetoacoustic transceiver of the second pair having a second resonance frequency different from the first resonance frequency, each magnetoacoustic transceiver of the second pair having an elastic membrane and a magnet attached to the membrane, the magnetoacoustic transceivers of the first pair separated by the separation space. The system also includes an acoustic barrier, disposed between magnetoacoustic transceivers of the first and second magnetoacoustic transceiver pairs. Acoustic oscillation at one magnetoacoustic transceiver of the first or second magnetoacoustic transceiver pairs induces an oscillation in the other magnetoacoustic transceiver of the pair, at the same frequency, via magnetic coupling.

In still other aspects, the present teachings provide a system for tunable sound transfer across a window for an automotive vehicle. The system includes a first magnetoacoustic transceiver, adjacent to and spaced apart from a first surface of the vehicle window, the first magnetoacoustic transceiver having an elastic membrane and an electromagnet attached to the membrane. The first magnetoacoustic transceiver has a first resonance frequency. the system also includes a second magnetoacoustic transceiver, adjacent to and spaced apart from a second surface of the vehicle window opposite the first surface, the second magnetoacoustic transceiver having an elastic membrane and a magnet attached to the membrane. The second magnetoacoustic transceiver has a resonance frequency substantially identical to the first resonance frequency. The system also includes a controller configured to modulate power supply to the electromagnet in response to a stimulus.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide a system for transferring sound across an acoustic barrier. The systems of the present teachings utilize magnetic coupling to transfer sound across a space that would otherwise be incapable of sound transmission. As an example, the systems of the present teachings can transfer sound across a vacuum, or any other sound barrier.

The systems of the present teachings include pairs of coupled magnetoacoustic transceivers. Each transceiver has an acoustic resonator and a magnet attached to the resonator. One of the resonators captures sound via resonant oscillation. Magnetic coupling with its partner resonator induces oscillation at the partner. This magnetic coupling is mediated by magnetic field coupling and is therefore independent of any medium between the transceivers. As such, sound is propagated from the first transceiver to the second and can do so across an acoustically non-transmissive space.

Figures 1A, 1B:
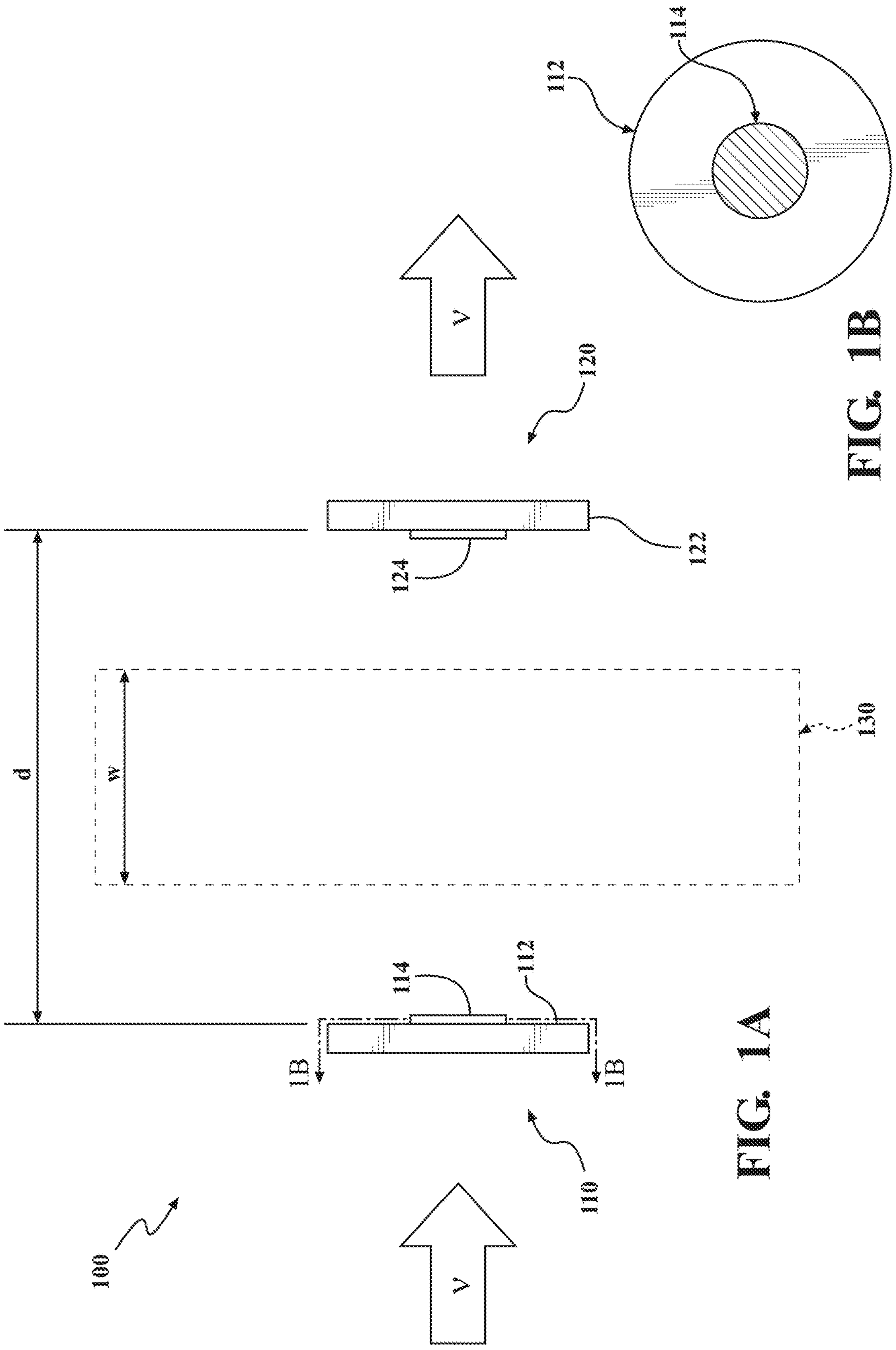
FIG. 1A is a schematic side view of a system for magnetic acoustic coupling across an acoustic barrier.
FIG. 1B is a schematic view of an elastic membrane of the system of FIG. 1A, viewed along the line 1B-1B of FIG. 1A.

FIG. 1A shows a side schematic view of an acoustic coupling system 100 of the present teachings. The system 100 includes first and second magnetoacoustic transceivers 110, 120, having first and second acoustic resonators 112, 122, respectively. The first and second magnetoacoustic transceivers 110, 120 are separated by a distance, d. In certain variations, the separation distance, d, can be within a range of from about 10 mm to about 100 mm. The space occupying the distance, d, can be referred to as a "separation space." In the example of FIG. 1, each of the first and second acoustic resonators is an elastic membrane. The elastic membrane constituting the first acoustic resonator 112 of FIG. 1A is a substantially planar structure having first and second opposing planar surfaces; and the clastic membrane constituting the second acoustic resonator 122 is a substantially planar structure having first and second opposing planar surfaces. An elastic membrane such as those constituting the first and second acoustic resonators 112, 122 of FIG. 1 can be formed of a thin layer of elastic material, such as a polymeric resin including various synthetic thermoplastics, latex, and any other suitable material. The resonance membrane can have a thickness of from around a few tens of micrometers to several hundred micrometers. The first and second magnetoacoustic transceivers 110, 120 can alternatively be referred to herein, collectively, as a "magnetoacoustic transceiver pair."

The first and second magnetoacoustic transceivers further include first and second magnets 114, 124 attached to the first and second acoustic resonators 112, 122. In some implementations, either or both of magnets 114, 124 can be permanent magnets, such as AlNiCo magnets or NdFEB magnets, or electromagnets. In particular, each of the first and second acoustic resonators 112, 122 has a magnet 114, 124, respectively, connected to it (e.g. magnet 114 is attached to the first acoustic resonator 112 and magnet 124 is connected to the second acoustic resonator 122). FIG. 1B shows a schematic view of the first acoustic resonator 112 with attached magnet 114, viewed along the line 1B-1B of FIG. 1A. FIG. 1B shows that the elastic membrane forming the first acoustic resonator 112 of FIGS. 1A and 1B is a circular membrane, and that its attached magnet 114 is circular and is attached at the center of the membrane. In many implementations in which the first and/or second acoustic resonator 112, 122 is an elastic membrane, it will be a circular membrane. In many implementations, the magnet 114, 124 will be affixed at the center of the membrane.

An acoustic barrier 130 is positioned between the first and second acoustic resonators 112, 122. The acoustic barrier 130 is a structure, material, or other barrier having low acoustic transmissibility at at least one wavelength of interest. In some instances, the acoustic barrier 130 can have low acoustic transmissibility at all wavelengths. For example, the acoustic barrier 130 can be a vacuum, a material of low compressibility, an acoustic reflector or absorber, or any other entity having low acoustic transmissibility at at least one wavelength of interest. In instances where the acoustic barrier 130 includes a vacuum, the acoustic barrier 130 will typically include an enclosing structure that contains a vacuum—a space substantially devoid of matter. As shown in FIG. 1A, the acoustic barrier 130 can be characterized by a width, w. It will be understood that the acoustic barrier 130 width, w, can be any distance less than the separation distance, d, between first and second magnetoacoustic transceivers 110, 120.

It will be understood that the first and second acoustic resonators 112, 122 will each have multiple resonance modes. In the circular elastic membrane example of FIG. 1 the acoustic resonators 112, 122 will each have a first mode resonance frequency, approximated by Equation 1:

$$f = \sqrt{\frac{T}{2\pi m \ln\left(\frac{a}{b}\right)}} \qquad \text{Equation 1}$$

where T is the initial membrane tension, m is the mass of the magnet, a is the radius of the membrane, and b is the radius of the magnet. It is to be understood that when resonance frequencies of the first and second acoustic resonators 112, 122 are discussed herein, reference is to the resonance frequency of the resonator as modified by the attached mass of the magnets 114, 124. This can alternatively be referred to as resonance frequency of the first and second magnetoacoustic transceivers 110, 120.

It will be understood that resonance mode frequencies are determinable design attributes of the first and second acoustic resonators 112, 122. In general, the first and second acoustic resonators 112, 122 will have at least one resonance mode of matching frequency. In many instances, the first and second acoustic resonators 112, 122 will be identical, with identical composition and geometry, so that the frequencies of their resonant modes are all identical.

Figure 1C:
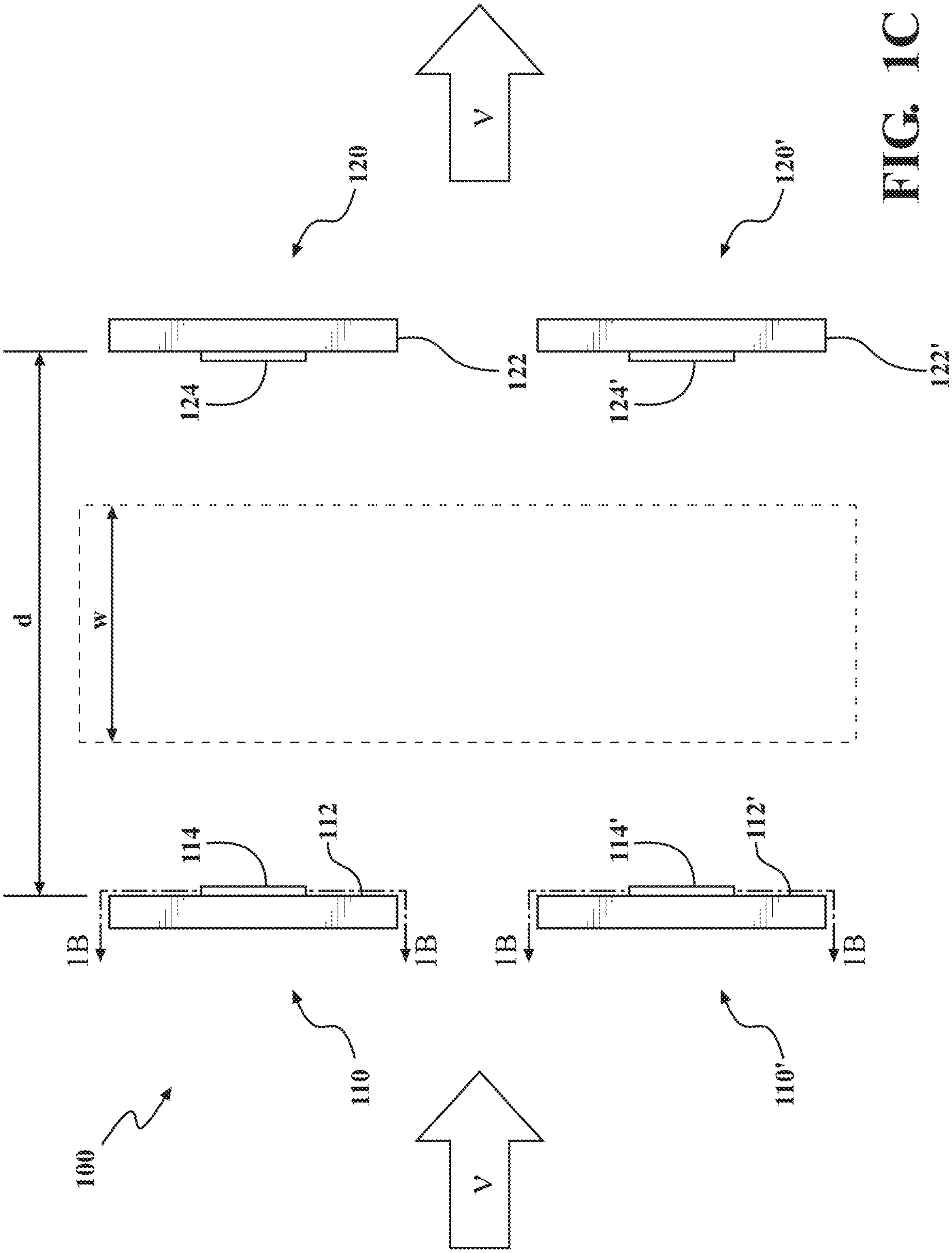
FIG. 1C is a schematic side view of a system for broadband magnetic acoustic coupling across an acoustic barrier.

In some implementations, a system 100 of the present teachings can have multiple magnetoacoustic transceiver pairs, each pair having a different resonance frequency. FIG. 1C shows a schematic side view of such an implementation, having first and second magnetoacoustic transceiver pairs

110, 120, 110', 120'. The second magnetoacoustic pair 110', 120' has a different frequency from that of the first magnetoacoustic transceiver pair, so that the system 100 is efficient at the resonance frequencies of both pairs. It will be understood that such an implementation can provide a broader frequency range of magnetoacoustic transfer across the acoustic barrier 130.

Figure 2B:
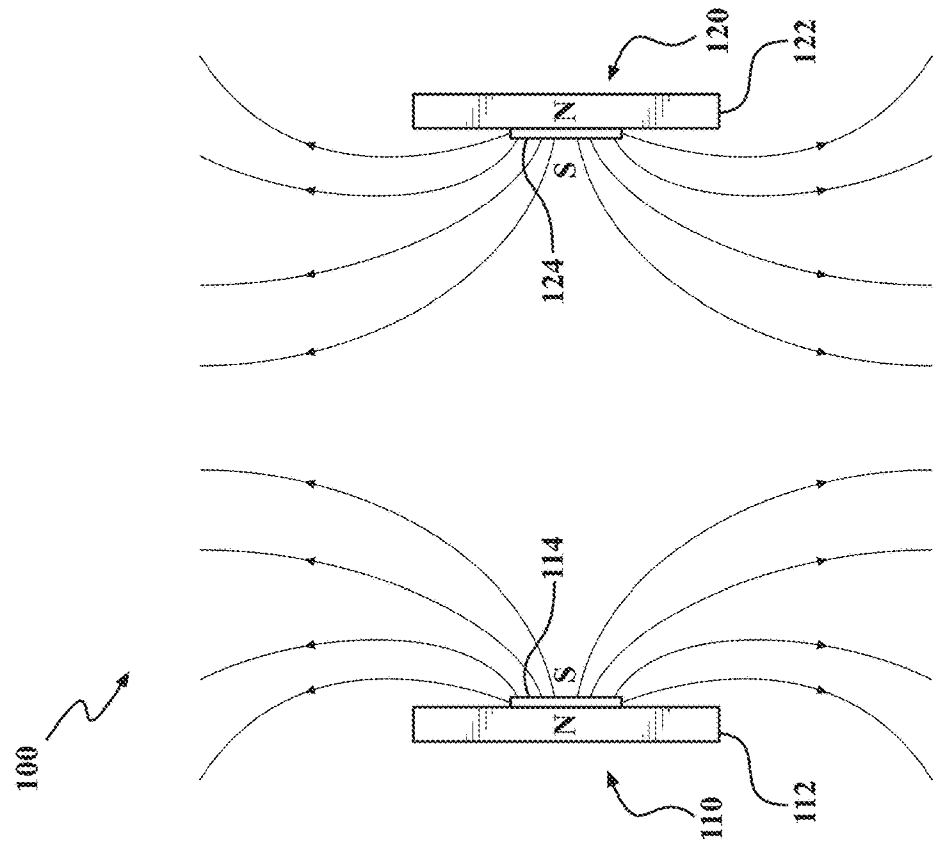
FIGS. 2A and 2B are side schematic views of devices of the type shown in FIG. 1A having magnetically attractive and magnetically repulsive coupling configurations, respectively.
Figure 2A:
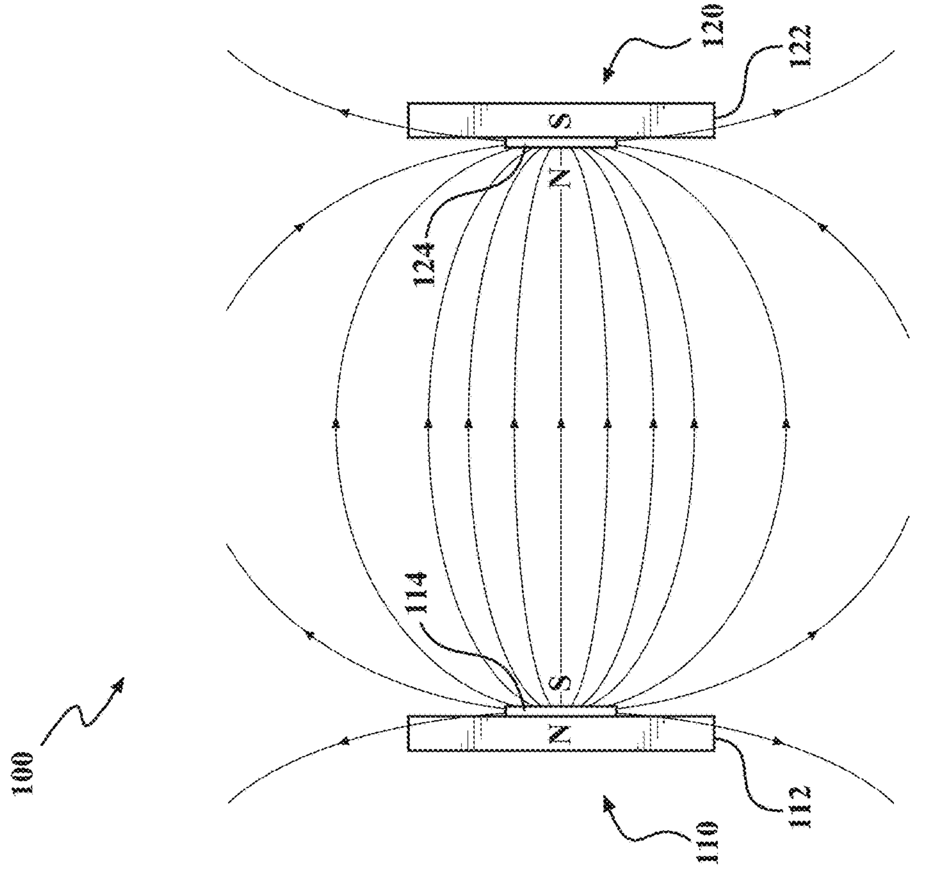

Magnetic coupling between the magnets 114, 124 of the first and second acoustic resonators 112, 122 enables sound to be transferred across the acoustic barrier 130 via magnetic coupling, even in the absence of conventional acoustic wave transmission. FIGS. 2A and 2B show magnetic field lines between the first and second magnets 114, 124 of the first and second magnetoacoustic transceivers, respectively. FIG. 2A shows a variation in which opposite magnetic poles (North/South) face one another, so that the first and second magnets 114, 124 are attracted to one another; while FIG. 2B shows a variation in which identical magnetic poles face one another, so that the first and second magnets 114, 124 are repelled by one another.

FIGS. 2A and 2B illustrate side schematic views of magnetoacoustic transceiver 110, 120 pairs, having different variations of magnetic pole coupling. When incident acoustic waves induce resonant oscillation in the first acoustic resonator 112, the first magnet 114 also oscillates. Due to the magnetic coupling between the first and second magnets 114, 124, as shown in FIGS. 2A and 2B, the oscillation of the first magnet 114 will induce an oscillation of the same frequency in the second magnet 124. Oscillation of the second magnet 124 directly causes oscillation at the same frequency of the second acoustic resonator 122. In the cause of magnetically attractive alignment, as in FIG. 2A, the oscillations of the first and second acoustic resonators 112, 122 will be in phase with one another; whereas in the case of the magnetically repulsive alignment, as in FIG. 2B, the oscillations of the first and second acoustic resonators 112, 122 will be of opposite phase relative to one another.

Figure 3B:
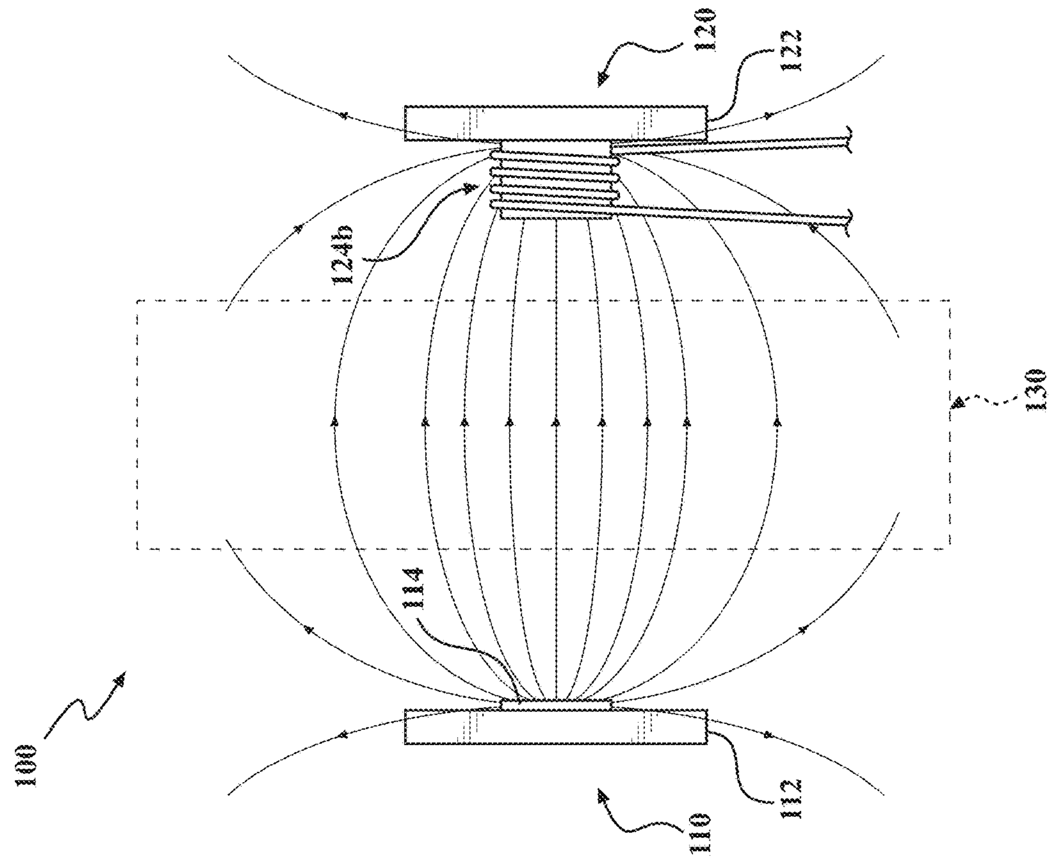
FIGS. 3A and 3B are side schematic views of devices of the type shown in FIG. 1A, having two or one electromagnet, respectively.
Figure 3A:
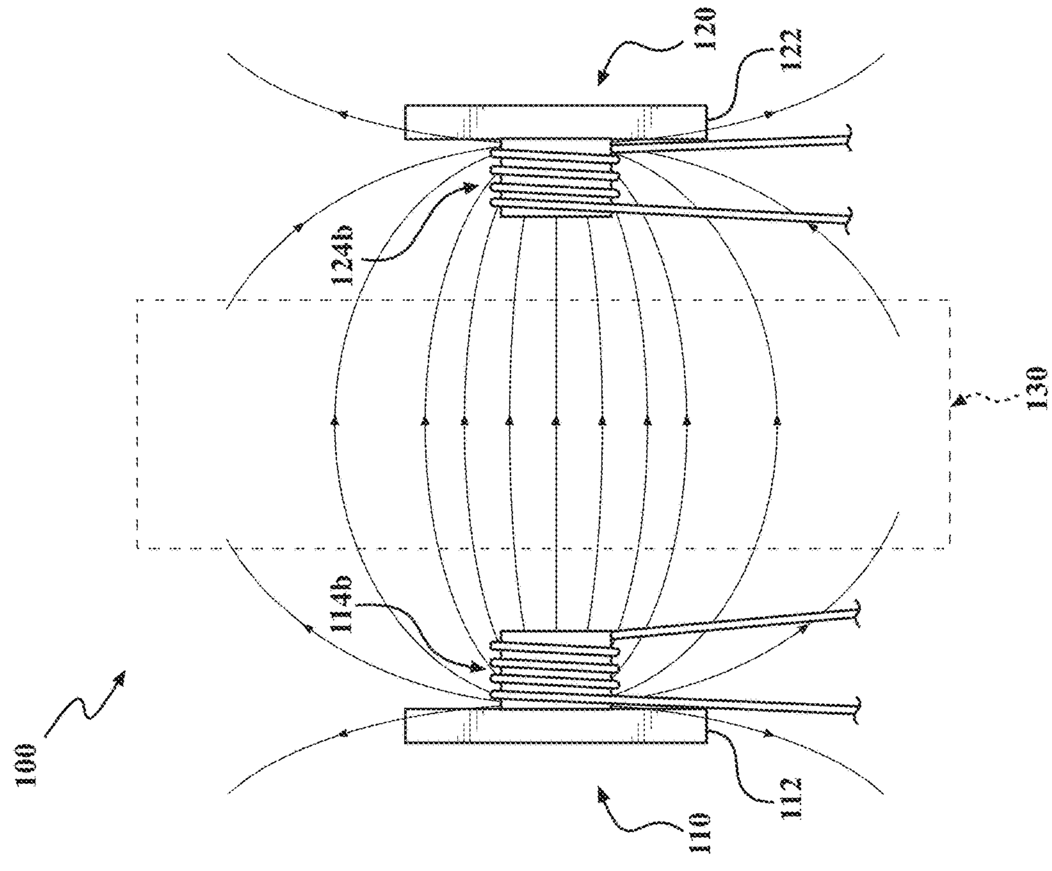

FIGS. 3A and 3B show side schematic views of systems 100 of the present teachings, in which both (FIG. 3A) or only one (FIG. 3B) of the magnets 114, 124 is an electromagnet. In the case of FIG. 3A, both magnetoacoustic transceivers 110, 120 have an electromagnet 114*b*, 124*b* whereas, in the case of FIG. 3B, the first magnetoacoustic transceiver 110 can have a permanent magnet and the second magnetoacoustic transceiver 120 has an electromagnet 124*b*.

It will be understood that a system of the present teachings can be bidirectional and that which magnetoacoustic transceiver operates to harvest incident acoustic energy and transmit it magnetically, and which operates to receive said transmission magnetically, is merely dependent on the direction of incoming acoustic waves. In the example of FIG. 1A, sound propagation is represented by the block arrow labeled “v” so that the first magnetoacoustic transceiver 110 operates as the acoustic harvester/transmitter, and the second magnetoacoustic transceiver 120 operates as the acoustic receiver, but this would be reversed if the direction of incident acoustic waves were reversed.

Use of one or more electromagnets 114*b*, 124*b* allows tuning of the operation of the system 100. Thus, and with reference to the directionality indicated in the example of FIG. 1A, when the first magnetoacoustic transceiver 110 is equipped with an electromagnet 114*b*, the electric power supplied to electromagnet 114*b* can be modulated or turned on and off to modulate the intensity of oscillation “signal” magnetically transmitted to the second magnetoacoustic transceiver 120. Similarly, when the second magnetoacoustic transceiver 120 is equipped with an electromagnet 124*b*, the electric power supplied to electromagnet 124*b* can be modulated or turned on and off to modulate sensitivity of response to the oscillation “signal” magnetically transmitted by the first magnetoacoustic transceiver 110. Thus, when one or both magnets 114, 124 is an electromagnet 114*b*, 124*b*, the magnitude of acoustic transfer across the acoustic barrier 130 can be selectively increased or decreased, including shutoff.

Figure 4A:
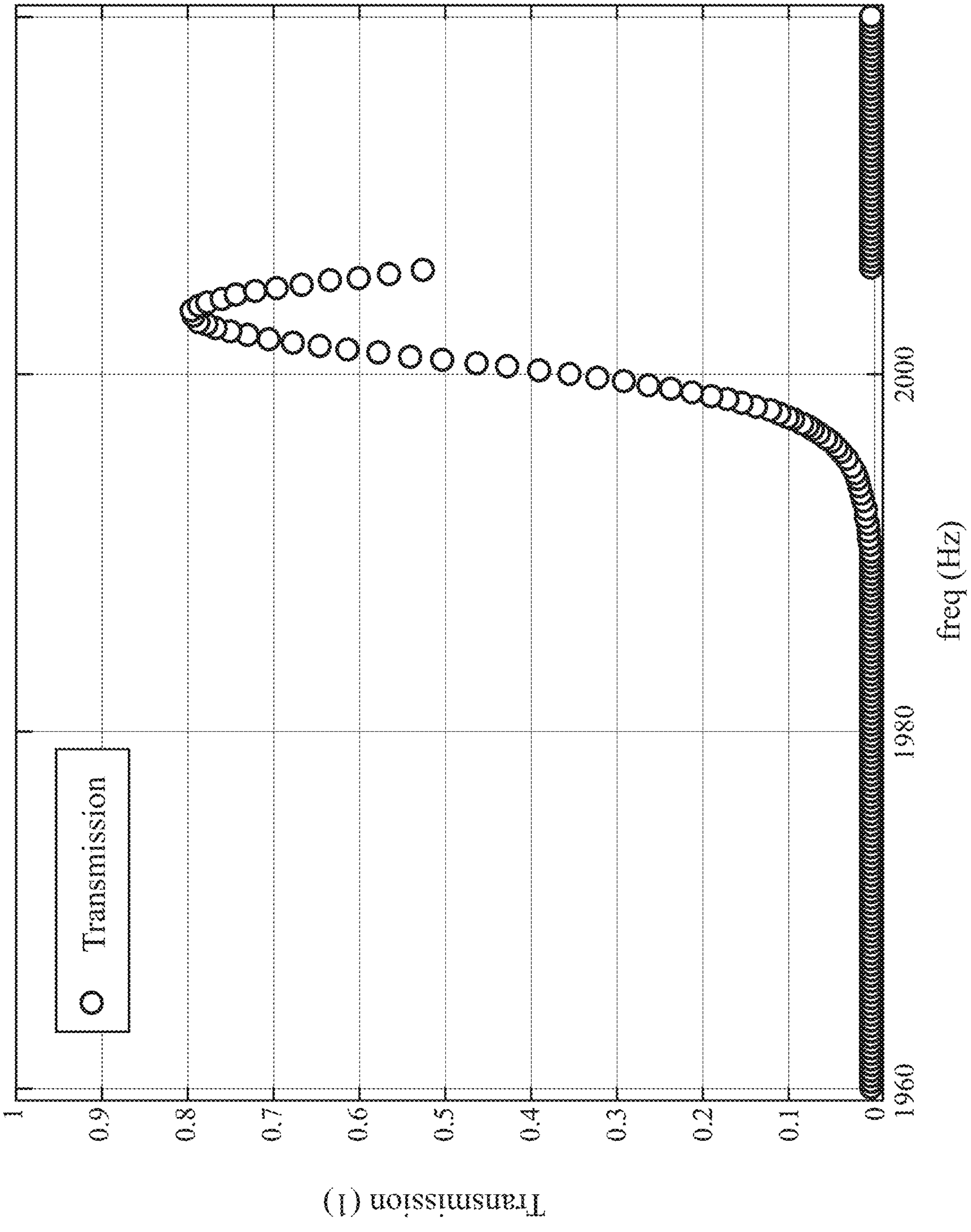
FIG. 4A is a graph of sound transmission as a function of frequency for an acoustic magnetic coupling device of the type shown in FIG. 1A.

FIG. 4A is a graph of simulated sound transmission data, as a function of frequency, for an acoustic magnetic coupling device of the type shown in FIG. 1A. Sound transmission in this case refers to the amplitude of propagating sound emitted by the second magnetoacoustic transceiver 120, as a proportion of propagating sound incident on the first magnetoacoustic transceiver 110. In the example of FIG. 4A, the resonator is a circular elastic membrane having a 25 mm diameter, the magnet is a circular disk with a diameter of about 10 mm with a strength of about 1 N/m. In this example, the first and second acoustic resonators 112, 122 have a resonance frequency of 2100 Hz. It will be observed that 80% of sound energy is transferred across the acoustic barrier 130, and received and propagated by the second magnetoacoustic transceiver, at the resonance frequency.

Figure 4B:
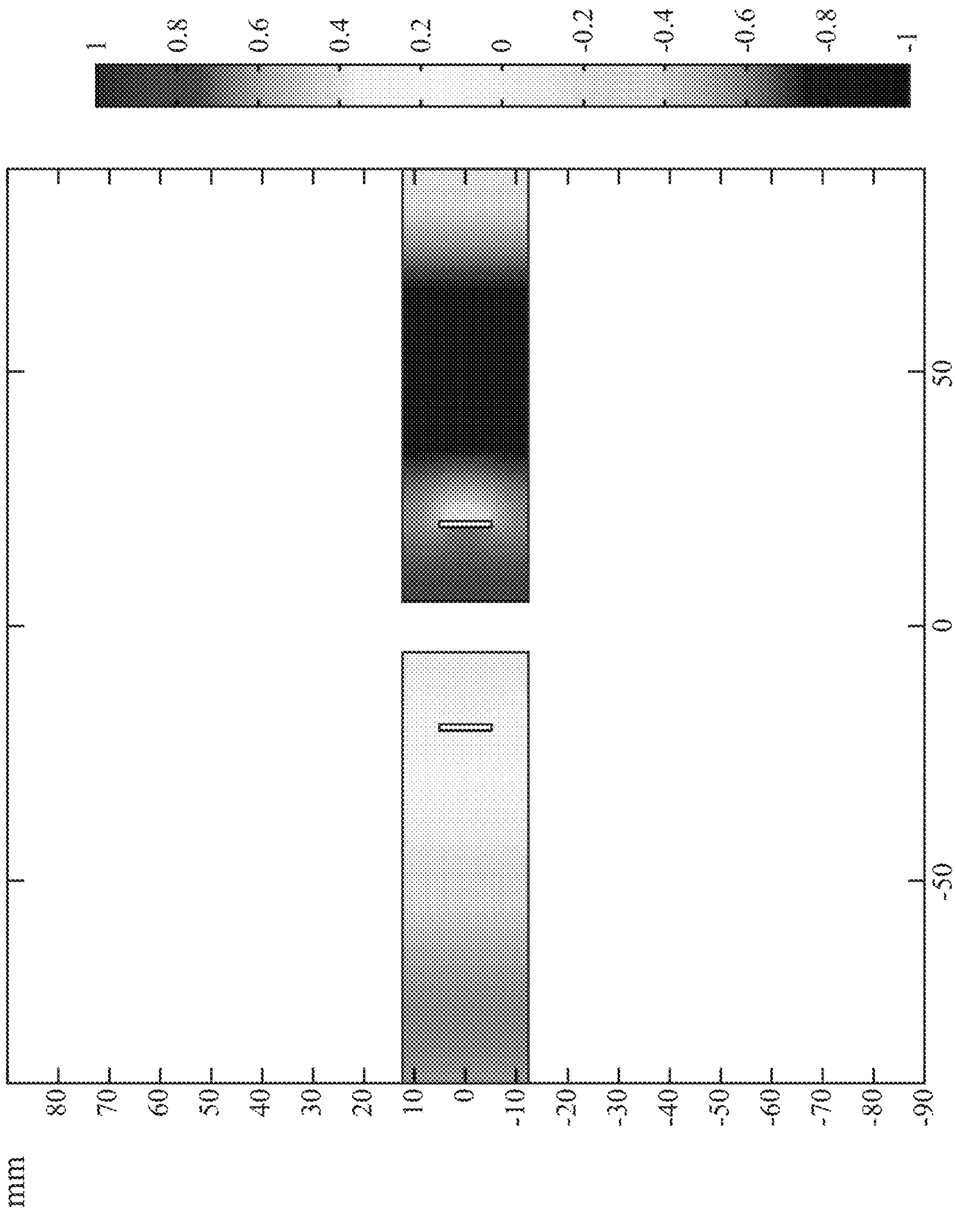
FIG. 4B is a plot of acoustic pressure field corresponding to the data of FIG. 4A.

FIG. 4B is a plot of acoustic pressure field at 2100 Hz for the simulated system 100 of FIG. 4A. In FIG. 3B, acoustic pressure field at 2100 Hz is shown. The acoustic barrier 130, a vacuum with a thickness, W, of 10 mm in this example, is clearly seen. The distance of separation, d, between the first and second magnetoacoustic transceivers 110, 120 in this example is 40 mm.

It will be appreciated that a system 100 of the present teachings can be usefully applied in various contexts in which it would be desirable to have controlled, intermittent sound transfer across an acoustically reflective structure, such as a window or wall. For example, a system 100 of the present teachings could be incorporated into an automotive vehicle, such that the first and second magnetoacoustic transceivers 110, 120 were placed on opposite sides of a vehicle window. As described above, either or both of the first and second magnetoacoustic transceiver 110, 120 can be equipped with an electromagnet 114*b*, 124*b* to allow magnetoacoustic transfer across the window to be turned on and off, to be volume modulated. A vehicle equipped with such a system would allow a user to better hear sounds outside the vehicle and/or communicate with persons outside the vehicle, when desired, while maintaining a quiet cabin when acoustic transfer is not desired. For example, a user could communicate with a drive through bank teller on a cold day without opening the window, and drive away with a quiet cabin.

Figure 5:
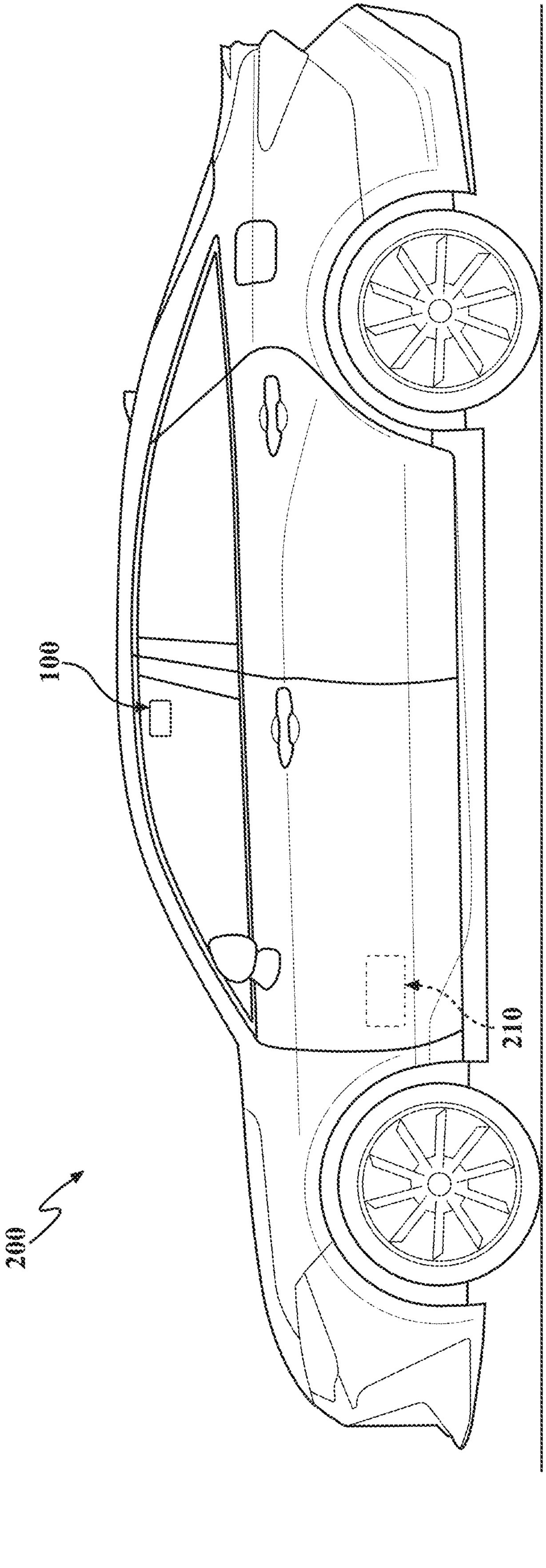
FIG. 5 is a schematic side view of a vehicle having a system for acoustic coupling across a window of the vehicle.

FIG. 5 shows a side schematic view of an exemplary automotive vehicle 200 equipped with a system 100 of the present teachings, as described above. In particular, first and second magnetoacoustic transceivers 110, 120 (not shown in FIG. 5, due to scale) are positioned on opposite sides of the vehicle side window, the side window functioning as the acoustic barrier 130. The vehicle 200 includes a controller 210 in electronic communication with at least one electromagnet 114*b*, 124*b* of the system, the controller 210 configured to modulate power supply to the at least one electromagnet 114*b*, 124*b* in response to a user-derived stimulus. Such a stimulus could be activation of a switch, pronouncement of a voice command, such as “communicate outside” or any other stimulus suitable to enable a user to control a vehicle function. It will be understood that, as described above, such an arrangement allows the user to reversibly alternate the system 100 between states in which it does, or does not, actively transfer sound across the vehicle window.

A method for transferring sound across an acoustic barrier is further disclosed. The method can include a step of positioning first and second magnetoacoustic transceivers 110, 120 on opposite sides of an acoustic barrier 130. The first and second magnetoacoustic transceivers 110, 120 and the acoustic barrier 130 are as described above. The method can further include a step of propagating acoustic waves toward either of the first and second magnetoacoustic transceivers 110, 120 such that the transceiver upon which such acoustic waves are incident oscillates at a resonant frequency, causing, via magnetic coupling its opposing magnetoacoustic transceiver to also oscillate at the resonant frequency, thereby emitting acoustic waves at the resonant frequency.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A broadband, magnetoacoustic coupling system, comprising:

a first magnetoacoustic transceiver pair, each magnetoacoustic transceiver of the first pair having a first resonance frequency and comprising an elastic membrane and a magnet attached to the membrane, the magnetoacoustic transceivers of the first pair separated by a separation space;

a second magnetoacoustic transceiver pair, each magnetoacoustic transceiver of the second pair having a second resonance frequency different from the first resonance frequency, each magnetoacoustic transceiver of the second pair an elastic membrane and a magnet attached to the membrane, the magnetoacoustic transceivers of the first pair separated by the separation space; and an acoustic barrier, disposed between magnetoacoustic transceivers of the first and second magnetoacoustic transceiver pairs, wherein acoustic oscillation at one magnetoacoustic transceiver of the first or second magnetoacoustic transceiver pairs induces an oscillation in the other magnetoacoustic transceiver of the pair, at the same frequency, via magnetic coupling.

2. The system as recited in claim 1, wherein the acoustic barrier has acoustic transmissibility less than 50% at the first and second resonance frequencies.

3. The system as recited in claim 1, wherein at least one magnet of each of the first and second magnetoacoustic transceiver pairs comprises an electromagnet.

4. The system as recited in claim 1, wherein the acoustic barrier comprises an enclosure defining a vacuum.

5. The system as recited in claim 1, wherein the acoustic barrier comprises an acoustic reflector having reflectance greater than 50% at the first and second resonance wavelengths.

* * * * *